Aug. 30, 1932.  W. E. URSCHEL  1,874,837
BEET HARVESTER
Filed April 24, 1929   6 Sheets-Sheet 4

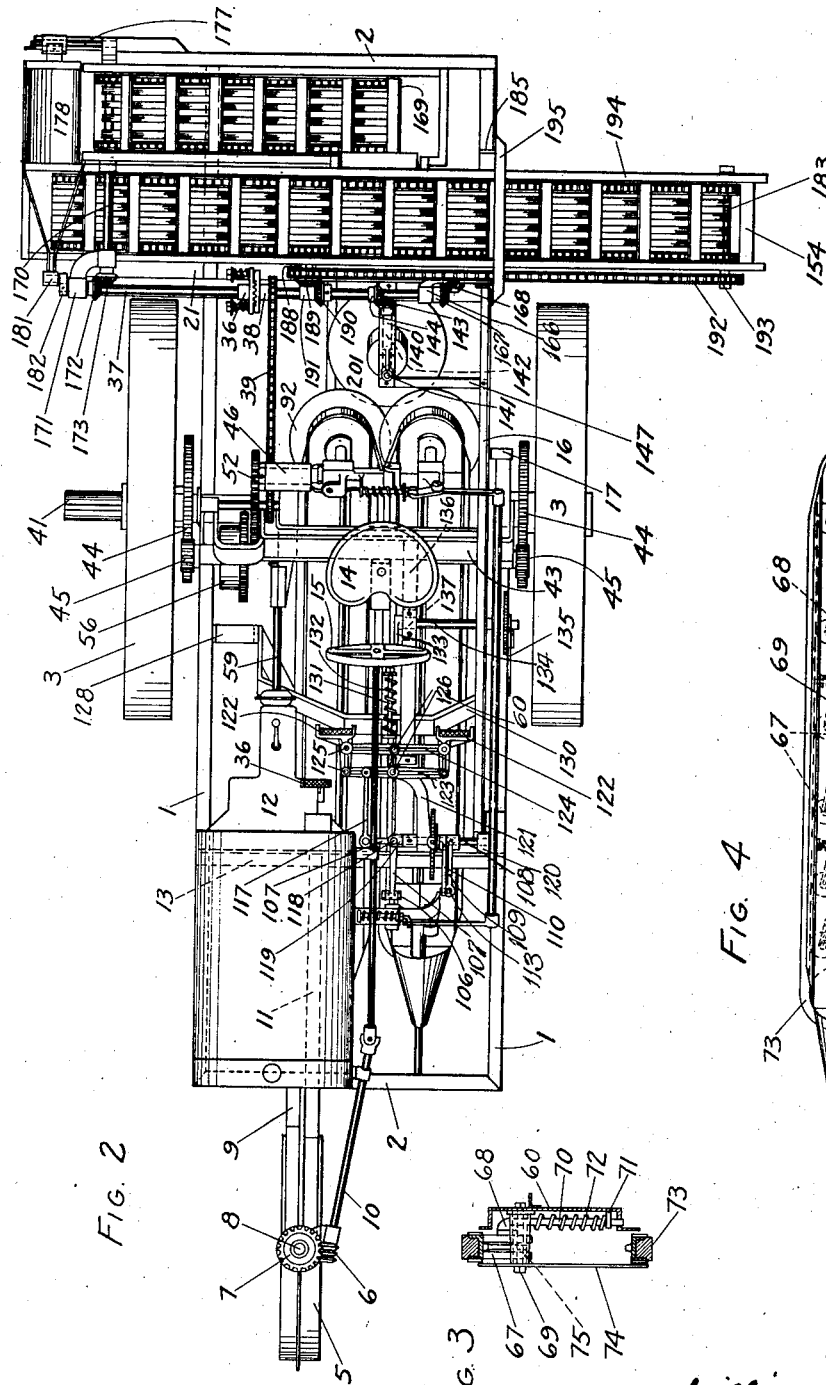

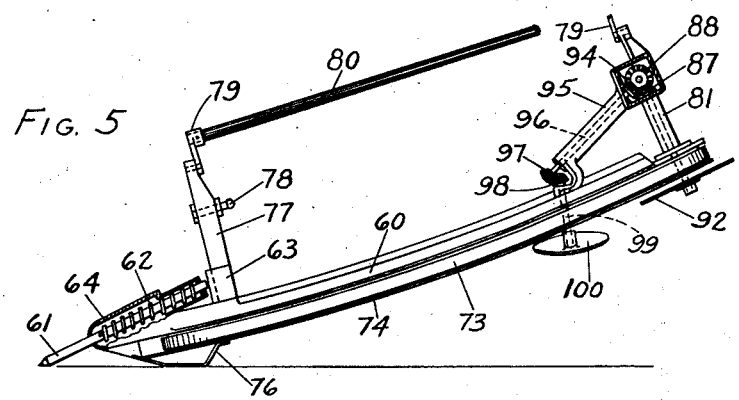
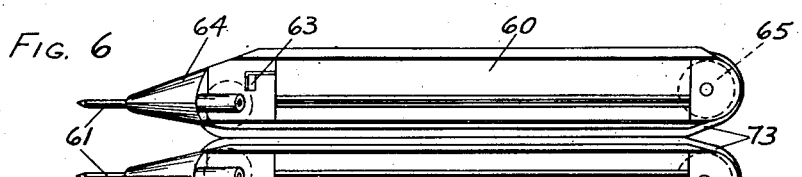
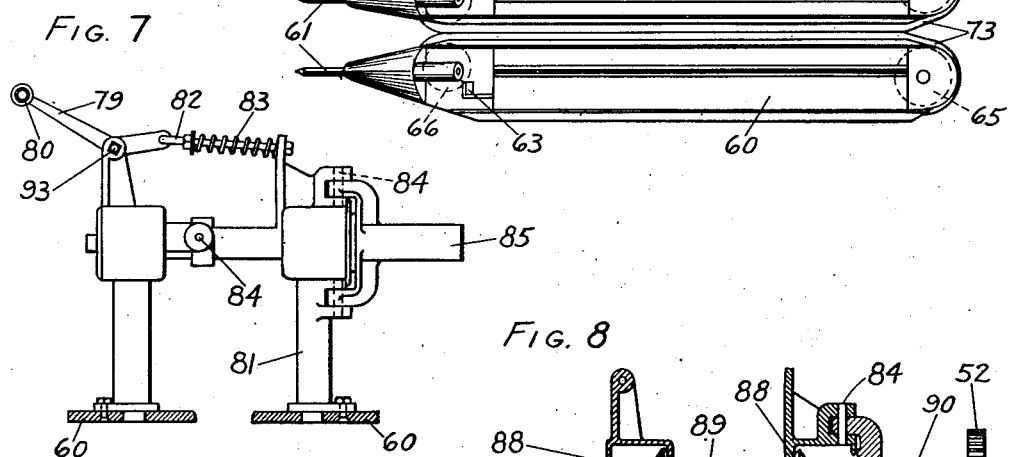
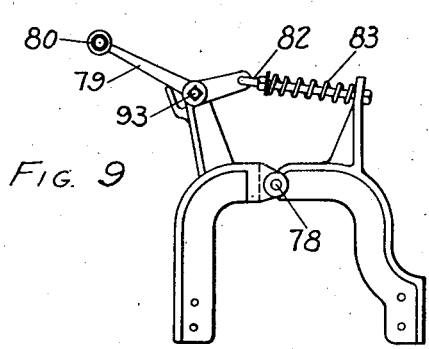
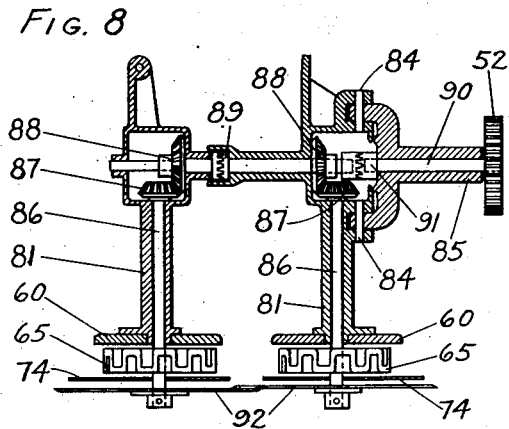

INVENTOR.
William E Urschel
BY
ATTORNEY

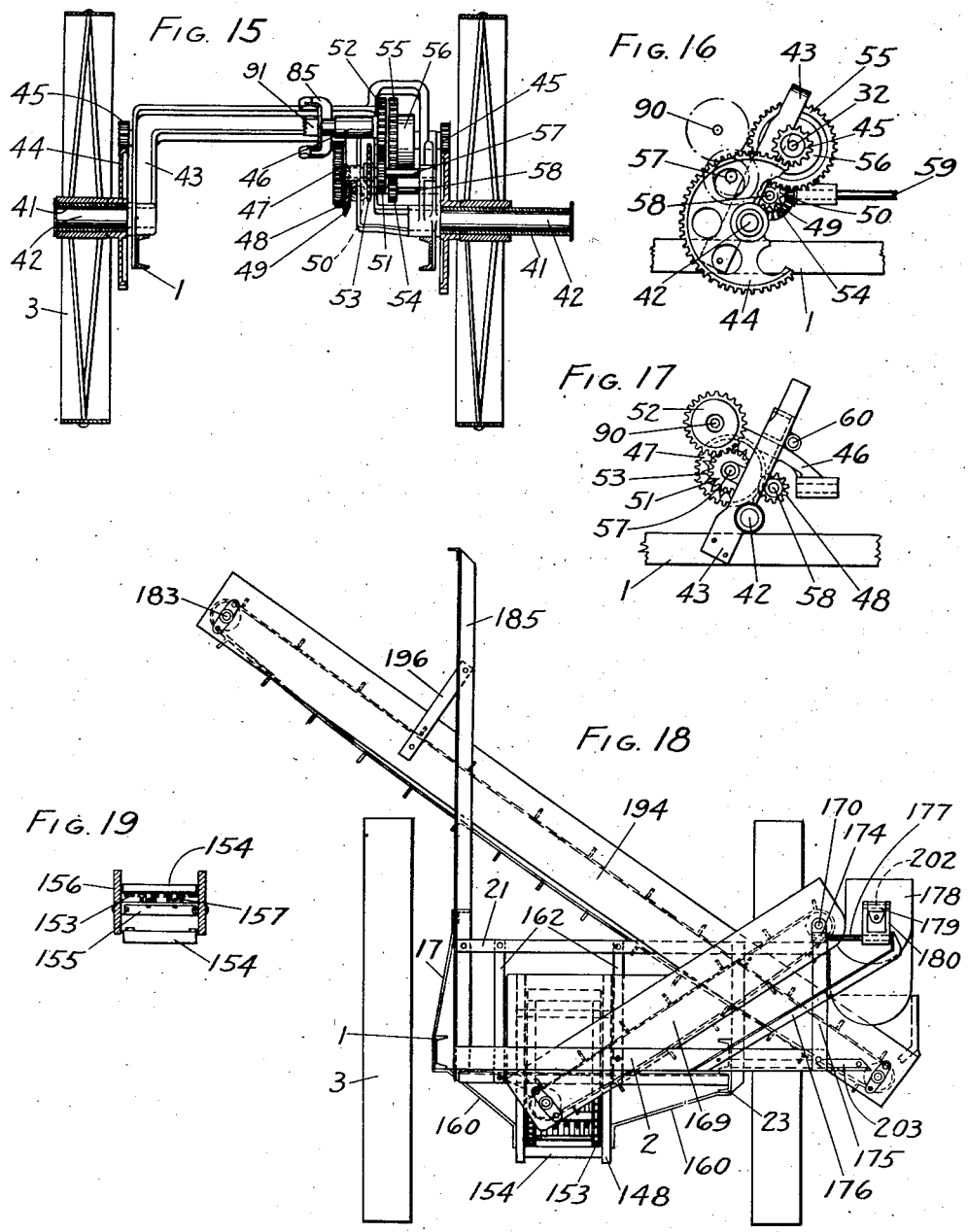

Aug. 30, 1932.　　W. E. URSCHEL　　1,874,837
BEET HARVESTER
Filed April 24, 1929　　6 Sheets-Sheet 6
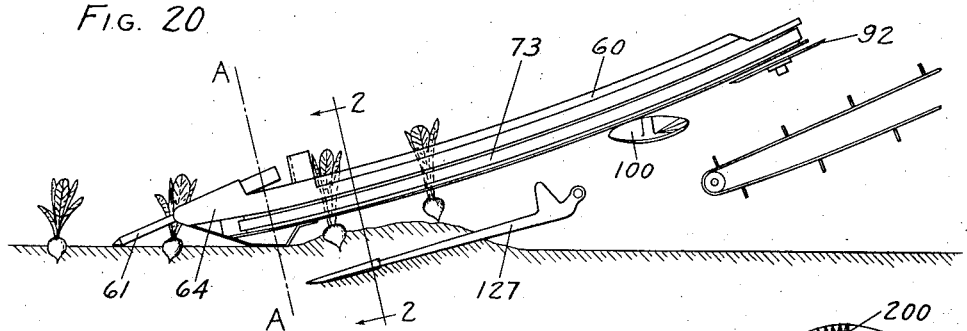
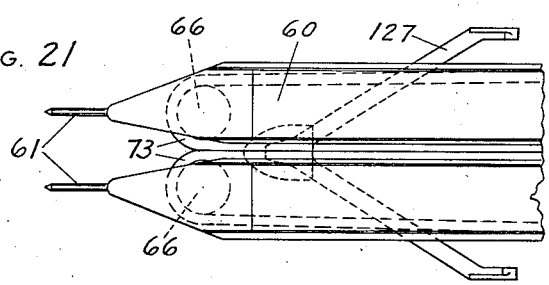
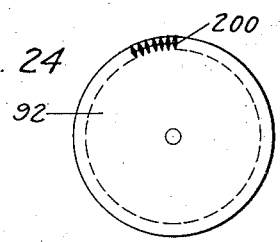
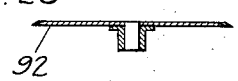
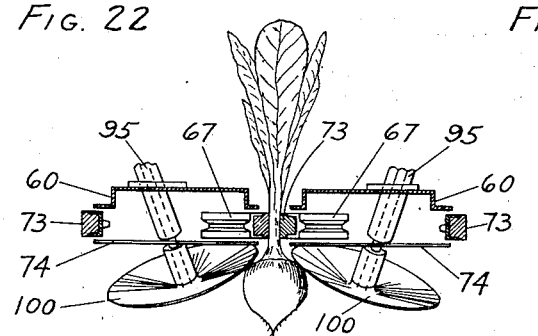
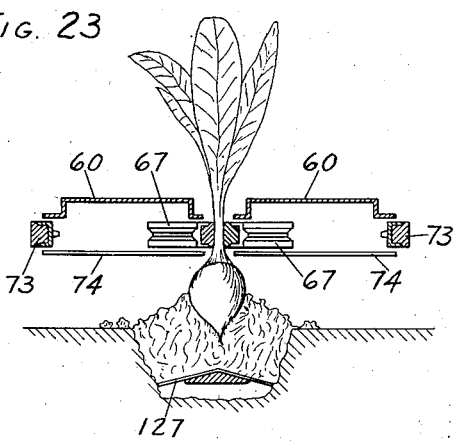
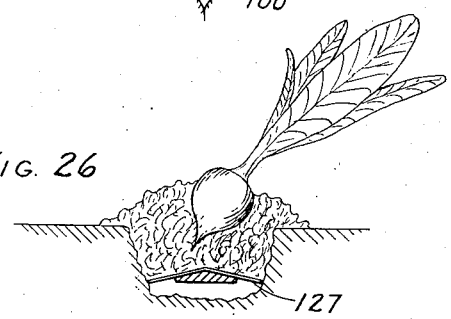
INVENTOR.
William E. Urschel
BY
ATTORNEY Patented Aug. 30, 1932

1,874,837

UNITED STATES PATENT OFFICE

WILLIAM E. URSCHEL, OF VALPARAISO, INDIANA

BEET HARVESTER

Application filed April 24, 1929. Serial No. 357,625.

The present invention relates to a harvesting machine, and more particularly to a beet harvester, although its subject matter may be employed with equal advantage for many other purposes.

It contemplates especially a power driven device adapted first, to gradually elevate a soil embedded crop to effect the removal thereof from the soil, next to sever the appendages from the crop, and subsequently to elevate the crop to such a height that it may be discharged into a wagon or suitable receptacle.

Harvesters of known constructions have not proven entirely satisfactory. Crops generally are somewhat tenaciously held in the soil, so that an abrupt pull thereon which heretofore has been the conventional manner of handling a crop usually results in a severance of the appendages of the crop without the removal of the embedded portions thereof from the ground.

Further, it is desirable to provide adjustment for a harvesting instrumentality, to enable a variance in the position thereof so as to effectively harvest a crop without injury to such crop as well as to grasp the harvested article at the proper point, this adjustability being highly desirable especially because direction and magnitude of the growth of a crop and the ease of its removal from the ground are variable factors.

Included in the objects of the invention, among others, therefore, are the following:

An improved means for imparting a gradual pull on a soil embedded crop to effect its removal therefrom.

An improved means for conjointly lifting and pushing a crop from the soil.

An improved means for conveying a crop along a predetermined path having therealong instrumentalities for severing the appendages therefrom.

A new and improved means for gauging the point at which the appendages upon a harvested article are to be severed from the body of said article.

The provision of improved means for elevating a harvested crop.

Other objects and advantages will appear from the following description of a single embodiment of the present invention.

In the drawings:

Figure 2 is a plan view of the machine shown in Figure 1;

Figure 3 is a transverse section of a puller frame such as is used in said machine;

Figure 4 is a plan view of said puller frame;

Figure 5 is a side elevation of a crop puller.

Figure 6 is a plan view of two associated pullers such as are shown in Figures 4 and 5;

Figure 7 is a rear view of the rear arch support for the pullers showing a spreader device therefor;

Figure 8 is a longitudinal section of the rear arch support;

Figure 9 is a rear elevation of the front arch support for the pullers;

Figure 15 is a transverse section of the device, partly in elevation, showing the transmission frame and drive;

Figure 16 is a detail side elevation of the puller drive;

Figure 17 is a detail side elevation of the bull wheel driving mechanism;

Figure 18 is a rear elevation of the complete elevator system;

Figure 19 is a transverse section of an elevator;

Figure 20 is a diagrammatic side elevation disclosing the principle of the machine and the relative position of the puller and plow;

Figure 21 is a fragmentary top detail of the pullers and showing the position of plow relative thereto;

Figure 22 is a transverse section providing a rear view detail of the gauging discs;

Figure 23 is a transverse section of the pullers and lifter taken on line 2—2 of Figure 20;

Figure 24 is a plan view of a cutter;
Figure 25 is a diametric section of a cutter; and
Figure 26 is a schematic section showing the action of a lifter when employed upon a crop that is unsupported by pullers or other holding means.

Like reference characters are used to designate similar parts in the drawings and in the description which follows.

For convenience, the machine may be divided into its several units, namely, frame, transmission mechanism, pullers and elevating mechanisms.

The main frame construction

Figure 1:
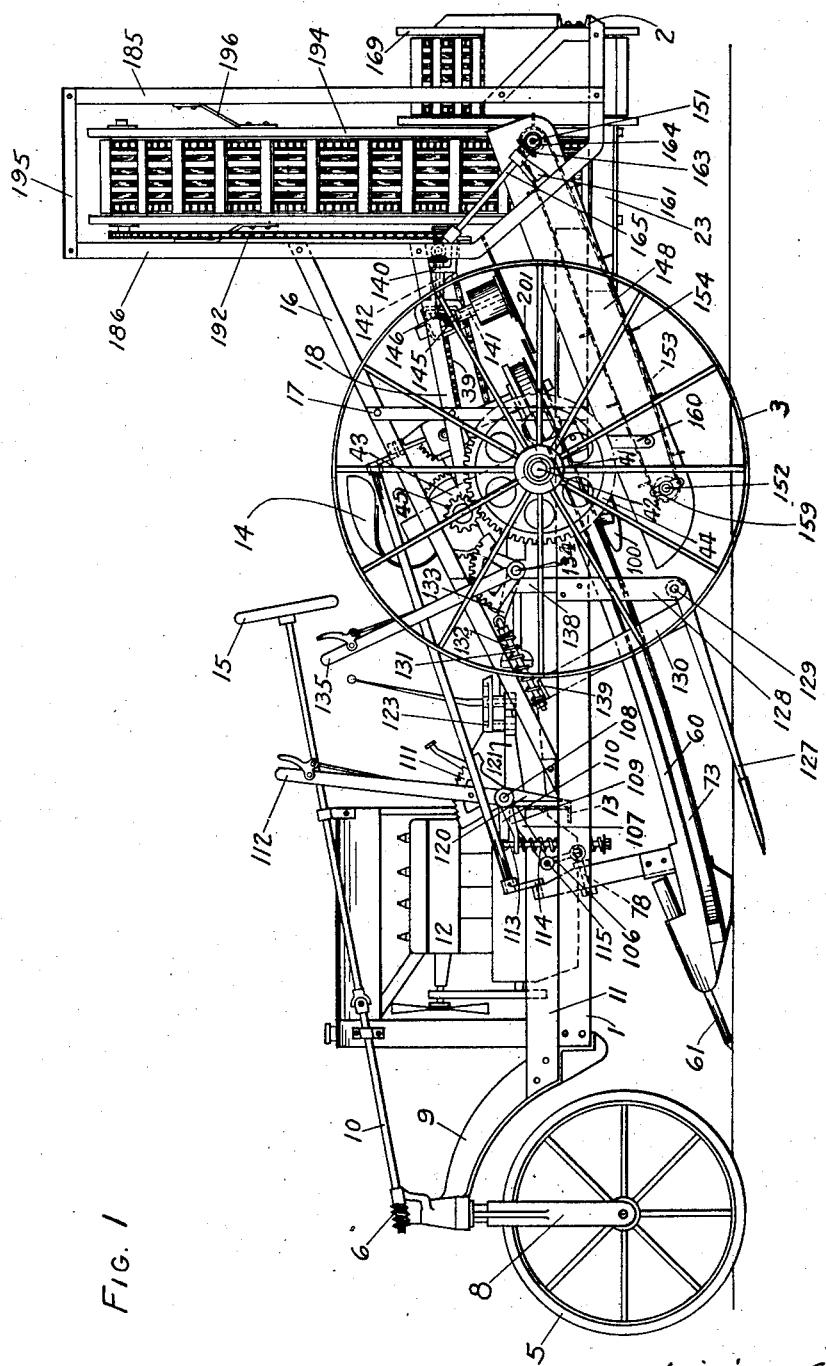
Figure 1 is a view in side elevation of a machine embodying features of the present invention.
Figure 10:
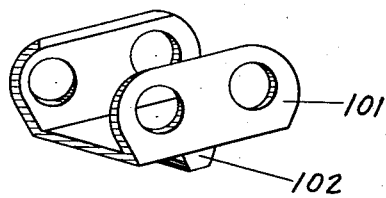
Figures 10, 11 and 12 are details, in perspective, of the puller chain.

Reference should be had to Figures 1 and 2. A frame for the device may comprise two longitudinally extending main frame members 1, secured together by a plurality of transverse frame members 2 and by a transmission frame 43. (See Figure 15.)

Two bull wheels 3, one on each side of and supporting the frame, are rotatably mounted on stub axles 42 which are secured in said transmission frame 43. Ring gears 44 are securely fastened to each of the bull wheels 3 by bushings 41.

Mounted in the forward end of the harvester on transverse frame members 2 and 13 is a conventional form of internal combustion engine 12, which constitutes the prime mover supplying power to the harvester.

Also in the front of the machine is a guide wheel fork 8 which extends upwardly and is rotatably mounted in a supporting bracket 9, the latter being secured to the frame of the harvester. In said fork, is a guiding or front wheel 5. A steering wheel 15, through suitable gearing, controls the angular position of the guiding or front wheel 5 from an operator's seat 14, which latter is secured to said transmission frame or bracket 43.

Said steering wheel 15 is secured to a rod 10 having as a part thereof a worm 6. Said worm 6 actuates a worm gear 7 secured to the front wheel fork 8. The position of wheel 15 therefore determines the direction of the movement of the apparatus.

The transmission

Extending rearwardly from the engine 12 to a bearing bracket 46, which is mounted on said transmission frame 43, is a clutch shaft 59. A pinion 50 is secured to shaft 59 and this drives a bevel gear 49, which is secured to a transverse shaft 58. Suitable bearings are provided for said shaft 58 in said transmission frame 43.

A pinion 54, securely mounted on said shaft 58 drives ring gear 55, said gear being mounted upon a conventional form of differential designated 56. A shaft 32 extending from the differential 56 is journaled in said transmission frame 43. Pinions 45 secured to shaft 32 drive ring gears 44 which are securely fastened to bushings 41. Bull wheels 3 are attached to said bushings 41 which are rotatably mounted on axles 42.

Gear 48 fastened to shaft 58 drives a gear 47 which is secured to a shaft 57. Suitable bearings are provided for shaft 57 in said transmission frame 43. A gear 51 secured to said shaft 57 drives a gear 52 which is attached to a puller drive shaft 90.

A sprocket 53 secured to shaft 57 drives chain 39. (See Figure 17.) Sprocket 38 securely fastened to an elevator drive shaft 37 is driven by chain 39. A slip clutch 36 of any suitable type may be mounted on said shaft 37 to prevent damage to the mechanism in case any foreign object should become wedged in the elevators. Similar slip clutches, while not shown in the drawings, may be mounted in such places where the mechanism may be damaged by clogging in the presence of foreign objects.

The clutch mechanism of the engine 12 may be controlled from the operator's seat by a conventional clutch controlling pedal 36.

The pullers

Mounted on the left side of the machine are two oppositely disposed puller frames 60. (See Figure 2.) The puller frames 60 are held in spaced relation at the forward end by an arch bracket 77. The rear end of the puller frames 60 is supported by a second arch bracket 81 which provides bearings for two vertical shafts 86 and the driving members therefor. (See Figures 5, 6 et seq.)

Said pullers 60 are supported on the transmission bracket 43 by bearing bracket 46. A clevis 85 is free to turn in said bearing bracket 46, permitting the forward end of the pullers 60 to be raised or lowered.

Said clevis 85 provides a bearing for a shaft 90 which is secured in a gear 52. Shafts 86 are driven from shafts 90 by bevel gears 87 and 88. Drive sprockets 65, which drive a rubber tired puller chain 73, are secured to said shafts 86.

The clevis 85 is hinged to the rear arch bracket by pins 84 which permit the front end of the pullers 60 to be guided transversely in keeping with irregularities in the crop row and an inability to drive the device with sufficient accuracy to provide exact registration at all times with a crop row.

To permit the pullers 60 to be moved transversely, a flexible joint 91 is mounted on shaft 90 at the point where the arch bracket 81 and the clevis 85 are hinged.

The stalk puller chain which comprises the rubber chain 73 includes main links 101, each having a projecting tooth 102 hinged to side plates 103 by rivets 104. Rivets 104 may turn in the main links 101 but are securely fastened in said side plates 103.

Figure 13:
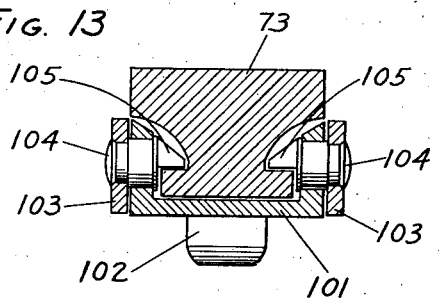
Figure 13 is a transverse section through the puller chain.
Figure 11:
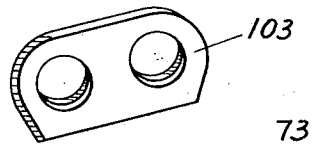
Figure 12:
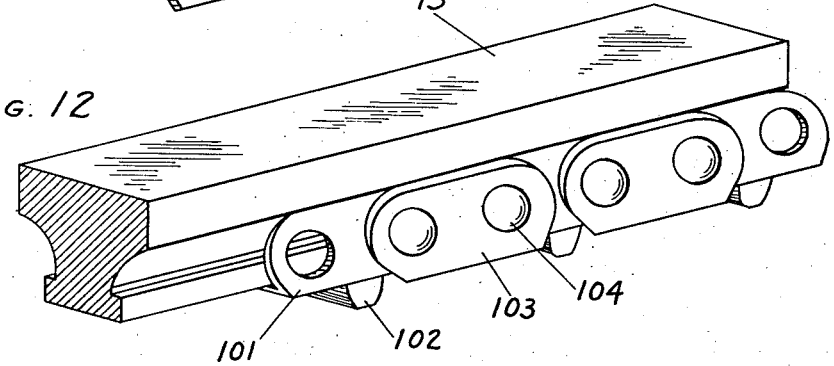
Figure 14:
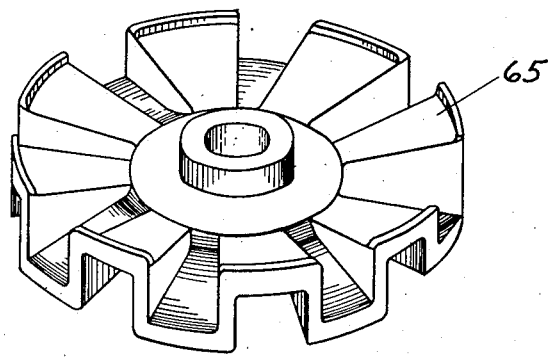
Figure 14 is a perspective view of the drive sprocket for the puller chain.

Mounted in the puller chain is the endless band 73 of yielding material such as soft rubber. Rivets 104 have an inwardly projecting head 105 (see figure 13) which fits into the opposed longitudinal side grooves in the endless band 73 and which retains said rubber chain in the channel of the puller chain links.

The forward end of said puller frames is provided with idler wheels 66. The puller chain 73 is pressed outwardly by a plurality of spring pressed idler rollers 67 which are rotatably journalled on pivoted arms 68.

Said pivoted arms 68 are pressed outwardly by compression springs 72 mounted on rods 70, one end of which rod is mounted reciprocally adjacent the free end of the pivoted arms 68, the other end of which is secured in the puller frame. Springs 72 exert a resilient tension to force the idler rollers 67 outwardly to provide sufficient tension to cause the arcuate carrier to grip and hold the exposed portions of the crops in a firm manner while being pulled from the ground.

The tension of the compression springs 72 may be adjusted by the take-up nuts 71, one of which is supplied with each rod 70.

The under section of each puller 60 is covered by a bottom plate 74 (see Figure 3) which plate is secured by bolts 69 passing through spindles 75 on which the arms 68 are mounted. The front end of the bottom plate 74 terminates in an attached guide plate 76 which serves to guide the puller over the ground at a predetermined height (see Figure 5).

The forward ends of the pullers 60 include a tapered portion 64 which serves to guide the exposed portion of the crop upwardly over the pullers 60 and between the resilient impinging crop pulling members 73. Pointed rods 61, reciprocally mounted in and projecting forwardly beyond the puller frames 60, are positioned to move in proximity to the ground to raise any part of the exposed portion of the crop which may be prostrate on the ground.

Compression springs 62 mounted between rods 61 and pullers 60 exert a resilient tension to force the rods 61 outwardly. In case the rods strike an obstruction, said rods 61 are forced back into the puller frames 60, thus permitting the rounded ends of the puller frames 60 to slide over the obstruction.

By employing a pair of oppositely disposed puller frames 60 urged together by compression springs 83, (see figures 7 and 9) the puller frames 60 may be made to separate. Levers 79 mounted on each of the arch brackets by means of bolts 93 are joined by tubular members 80.

One end of a rod 82, around which spring 85 is coiled, is mounted in said lever 79. The other end of said spring rod 82 is mounted reciprocally in said arch brackets. In the event a stone or other foreign object is wedged between the stalk puller frames 60, the tension of the springs 83 may be relieved. This is accomplished by raising the tubular member 80 which in turn lowers the horizontal plane where spring rods 82 are disposed by moving levers 79 and drawing apart the puller frames 60. To permit the puller frames to move in relation to each other, a flexible joint 89 is mounted on shaft 90 at the point where the arch brackets are hinged.

The puller is supported at the front end by a bell crank 107 (see Figure 1) which crank is secured to an extended pivot pin 78 by a connecting rod 106. Connecting rod 106 is fastened to bell crank 107 by a pin 115 and to a pivot pin 78 by a ball and socket joint. Bell crank 107 is secured in a clevis 119 by a pin 118 of such construction that it will allow transverse movement of the puller when it is guided along a row of crops.

Clevis 119 is securely fastened to a shaft 108 which is rotatably mounted in brackets 120 and 121 secured to the transverse frame member 13. Arm 110 which is secured to a hand lever 112, is mounted on shaft 108 so that said shaft 108 is free to turn in arm 110. Arm 109 is securely fastened to shaft 108.

Spring rod 113 is mounted in arm 110 and passes through arm 109 its lower end being secured to a bracket (not shown) anchored to the arch bracket 77. A spring 114 mounted on rod 113 exerts a resilient tension on arm 109 which aids the puller to slide over obstructions and uneven ground. By the hand lever 112 the height of the pullers 60 may be adjusted by the machine operator from his seat thereon. To the bracket 121 is attached a quadrant shaped piece 111 having notches therein for holding the lever 112 in a selected position against the urge of the spring 114 and the weight of the pullers 60 when the latter are lifted from the ground.

The pullers 60 may be moved transversely to guide them to register with the row of the crop by foot levers 123 and 124 which are pivoted on a bracket 121 by pins 126. Foot rests 122 are mounted on said foot levers 123 and 124 by studs 125 secured in said foot levers 123 and 124. Foot lever 123 is joined to bell crank 107 by rod 117. By using two foot levers, the foot rests 122 are at all times in a transverse position with respect to the machine.

The exposed portions of the crops are sheared or otherwise severed from the body thereof in the machine. In this instance, they are removed by means of a pair of oppositely disposed circular cutters 92 fixed to shafts 86 which impart opposed rotation thereto, the cutters 92 being disposed directly in the path of the crops defined by the puller mechanism. To assist in carrying the body of the crop past the cutters 92, notches 200 (see Figures 24 and 25) are cut in the bevel of the cutter. Said notches 200 tend to pull the crop between the cutters.

Due to the irregularities in size of the crop and the nature of the soil, a crop grows at various depths in the ground. The cutters 92 are adjusted to sever the exposed portion of the crop which grows at the greatest depth at a desired point.

Two circular oppositely disposed dished gauging discs 100 are positioned below the puller frames in such a manner that the exposed portion of the crop is carried between the gauging discs 100. Because of the slope of the gauging discs 100 relative to the pullers, and crop which is grasped by the puller at a point where it will not pass under the cutters 92 will be pulled downwardly, thus permitting the exposed portions of the crop to be severed above the body of the crop.

Each of said gauging discs 100 is secured to a shaft 99 for which suitable bearings are provided in a bracket 95, which bracket is mounted on the puller frame 60 and the rear arch member 81.

Bevel gear 98 which is secured to shaft 99 is driven by bevel gear 97. Said bevel gear 97 is secured attached to a shaft 96 which is journaled in said bracket 95. A bevel gear 94 secured to shaft 96 is rotated by a bevel gear 87.

A lifter 127 is mounted under the puller to assist it in raising a crop. The lifter is adapted to run into the ground under the body of the root crop. The lifter or ground breaking mechanism 127 is pivoted on studs 129 set in brackets 128 which are secured to the main frame members 1. A spring rod 131, one end of which is reciprocally mounted in bracket 139 secured to the arch shaped portion 130 of the lifter 127, is secured in arm 133. Spring 132 mounted on spring rod 131 exerts a resilient tension on the arch shaped portion of the lifter and forces the free end of the lifter 127 into the ground. In case the lifter strikes an obstruction, such as a stone, the spring 132 allows the lifter to be raised over the obstruction, thus preventing damage to the machine.

Arm 133 is secured to a shaft 134 which has suitable bearings in brackets mounted on frame member 136 and upright member 17. Shaft 134 is secured in hand lever 135 by which the operator may control the height of the lifter from his seat.

To discharge the severed exposed portions of the crop, a rotating disc 201 which is mounted under the cutters 92 carries the tops of the crop to the left side of the machine where they fall upon the ground. (See Figure 2.) A bracket 140 is secured to the transverse frame member 21 and a brace 147. Gear 144 mounted on shaft 37 drives gear 143 which is secured to shaft 142. Gear 146 secured to shaft 142 drives gear 145 which is fixed to shaft 141. Disc 201 is secured to shaft 141.

The elevators

The elevators of the machine (see Figure 19) consist of side boards 156 held together by a plurality of cross members 155. A plurality of T shaped members 157 serve as slides for cleats 154 which are secured to a conveyer chain 153.

At one end of the elevator, the chain 153 runs on idler sprockets secured to an idler shaft 152 which runs in bearings 159. At the other end of the elevators is mounted a drive shaft 151 to which the drive sprockets are secured. The T shaped members 157 are spaced apart to permit the soil shaken from the crop to be separated from the crop.

Elevator 148 is positioned under the cutters 92 to receive the crops which fall from the pullers after being severed from the tops. Elevator 148 is supported at the front by brackets 160 which are secured to the main frame members 1. The rear end of the elevator 148 is supported by brackets 161 which are secured to frame members 162 on each side of the elevator.

Gear 167 secured to shaft 37 drives gear 168 which is fixed to shaft 165. Bracket 166 mounted on transverse frame member 21 provides suitable bearings for said shafts 37 and 165. Gear 163 secured to shaft 165 drives gear 164 which is secured to the elevator drive shaft 151.

A second elevator 169 is disposed to receive the crops discharged from elevator 148. Elevator 169 is supported at the left end by the transverse frame member 2 and at the right end by a bracket 174 which is mounted on an upright member 175. Elevator drive shaft 170, which is journaled in brackets 174 and 171, is driven by a gear 173. Gear 173 is driven by a gear 172 which is secured to said shaft 37.

Elevator 169 discharges the crops into a shaker 178 which is perforate and which is driven in a reciprocating manner by a crank 182 also secured to said shaft 37. A bearing 181 is mounted on the crank pin of the crank 182. The rear end of the shaker is supported upon a rod 177 which is secured in the bracket 174 and brace 176. Arm 180 is rotatably mounted on rod 177. Bracket 179, secured to the shaker 178, is pivoted to arm 180 by a pin 202.

The shaker 178 discharges the crops in a third elevator 194 which is supported on the right end by brackets 203. The left end is supported by two longitudinal frame members 16 and 18 which are secured to the main frame member 1 and the transmission frame 43.

Upright member 186 is secured to the frame members 16 and 18 and the transverse frame member 2. A second upright 185 is secured at its bottom to member 186 and at the top to a cross piece 195 which joins the two uprights together. Elevator 194 is firmly secured to the upright members 186 and 185 by brackets 196.

A gear 190 secured to said shaft 37 drives gear 189 which rotates on a stud fixed in the bearing bracket 191. A sprocket 188 secured to the gear 189 drives chain 192 which in turn drives sprocket 193. Said sprocket 193 is securely fastened to elevator drive shaft 183.

General remarks

With the arrangement of parts above described, it will be apparent that a machine has been provided having pulling instrumentalities 73 thereon which are adapted to grasp the exposed appendages of the soil embedded crops to gradually elevate them along a predetermined path to effect removal thereof from the soil and to sever the appendages therefrom.

The mouth of the pulling means, in this instance defined by the cooperating puller units, is guided in a line coinciding with the linear path along which crops usually are positioned so that the contacting faces of the flexible puller chains 73 will yieldably grasp the exposed portions of the crop and carry them along an arcuate path having a gradual incline to slowly pull the crop from the soil.

The crops are first engaged by the pulling members on line A—A (see Figure 20). As the crop is carried rearwardly, the lifter 127 which cooperates with the pullers 73, loosens the ground about the crop and pushes or lifts the crop from the ground. Likelihood of injury to the crop is very slight in this process of resiliently gripping the plant upon opposite sides of it exposed growth, and substantially concurrently breaking the ground about its roots.

The position of the lifter 127 in respect to the pullers is of vital importance. Experience has shown that if the lifter is positioned ahead of the point where the crop is engaged by the pullers, the crop is often pushed aside by the lifter before it is grasped by the pullers. This is schematically illustrated in Figure 26.

Experience has also shown that the lifter should be positioned as shown in Figure 20. The exposed portion of the crop, if first grasped by the pulling members, must be gripped by members having insufficient tension to separate the exposed appendage from the body of the crop. As the pullers begin to raise the crop, they grasp the crop more firmly and the lifter, exerting an upward pressure against the crop from beneath, aids the pullers in raising the crop from the ground.

The crops are carried to the topping instrumentalities. Before reaching these, the crop is adjusted in the device for proper severance by discs 100. In this case, the clutters 92 sever the exposed foliage from the body of the crop, the latter dropping to the elevator 148 which carries the crop rearwardly and discharges it in the elevator 169.

The crop is discharged from elevator 169 into a shaker 178 from which the crops are deposited to elevator 194. The crop is carried to the side of the machine by elevator 194 which will effect the discharge of the articles into the box of a wagon moving along the side of the harvester or any appropriate container.

Any loose dirt which is shaking from the crop drops through the slots in the elevators to the ground and is thus separated from the crop. The foliage is cast to one side.

This application is a continuation in part of an application, Serial No. 102,113, filed April 15, 1926, and entitled Bean harvester, such application also having been filed in the name of the applicant, William E. Urschel. Said application has since the filing of this application become patent numbered 1,727,020, dated September 3, 1929.

Reference should also be had to the applicant's Patent, No. 1,775,419, of September 9, 1930, and to his co-pending application for Letters Patent, Serial No. 270,234, filed September 16, 1928.

I claim:

1. In a harvester, resilient impinging crop pulling members adapted to compressibly grip the crop from the sides thereof and to lift it from the ground, and a ground breaking means operative under said crop.

2. A beet harvester comprising means for elevating beet plants in an arcuate path and providing a pulling mechanism therefor, and a plant lifting member elevating said beet plants by engaging the ground directly therebeneath.

3. A beet harvester comprising plant grapping means for elevating beet plants and a ground breaking mechanism operable upon the soil directly beneath said plants after their engagements with said elevating means.

4. A process of harvesting entire plants comprising the several steps of resiliently gripping the plant upon opposite sides of its exposed growth, and substantially concurrently breaking the ground directly about its roots.

5. A process of harvesting entire plants characterized by the steps of resiliently grasping opposite sides of the exposed portion of the plant, substantially concurrently loosening the ground immediately beneath the roots thereof, and elevating the plant from the broken soil.

6. A process of harvesting beets characterized by the following steps in the order named, gripping the beet plants from opposite sides thereof, maintaining the plants in an upright position, lifting the soil directly beneath and elevating the beets out of ground after the soil is broken.

7. A beet harvester comprising a unitary means for resiliently gripping beet plants at opposite sides thereof and conveying such plants, and means suspended directly beneath the fore part of the conveyor for breaking the ground beneath the beet plants.

8. A beet harvester comprising opposed conveying means of compressible material gripping beets by their tops and at their opposite sides, and a soil-breaking means for loosening the soil about the beets positioned intermediate and beneath said conveying means.

9. A beet harvester comprising conveying means for the beet plants, said conveying means having resiliently gripping faces for engaging the tops of the beet plants, paired disks in the path of plants in said conveyor means for shifting the position of said plants in said conveying means, and means in association with said conveying means for severing said beets from said tops.

10. A beet harvester comprising a means for conveying beets along an arcuate path, disks at each side of said conveyor and disposed in relation to the path of said conveyor for moving beets transversely of said conveying means and severing means operable upon said beets while in said conveying means.

11. In a beet harvester, a frame, a ground breaking member having a pointed end thereon and operating directly beneath the crop, and opposed flexible and impinging members on said frame and having a path of movement upwardly and in vertical alignment with the pointed end of said ground breaking member and adapted to first grip the crop, second to hold it, and third in conjunction with said ground breaking member, to lift such crop from the soil.

12. In a beet harvester, a ground breaker having a point adapted to operate beneath the crop, gripping and pulling means to grasp the tops of the plant and then coacting with said ground lifting means to lift the crop from the soil, a cutting means, and gauging means comprising rotating disks having angularly disposed axes and in the path of the crop when in said gripping means to position the crop for contact with said cutting means.

13. In a beet harvester, a ground lifter having a pointed end and body, the body being adapted to travel in a path directly beneath a crop, gripping and pulling means adapted first to grasp the top of a crop and then coacting with said lifter to gradually pull the crop from the broken soil, disks at the opposite sides of said gripping means and by which the plants in said gripping and pulling means are positioned, cutting means to sever the top from the crop disposed in the path of the crop and operable after the crop has been positioned, and conveying means for the severed beets.

14. Means for harvesting soil embodied crops comprising a carrier gripping the tops of the crops and having a portion adjacent to and substantially parallel with the ground, and a soil lifter therebeneath adapted to elevate the crop and break the soil thereabout coincident with the engagement of the carrier with the tops of said crops.

15. In combination, an arcuate carrier for grasping the tops of crops and having a front portion substantially parallel to the ground, and a soil elevating plow having its forward point slightly to the rear of the forward end of said carrier.

WILLIAM E. URSCHEL.